(12) United States Patent
Alfarano et al.

(10) Patent No.: US 12,262,209 B2
(45) Date of Patent: *Mar. 25, 2025

(54) METHOD FOR REMOTE PROVISIONING OF SOFTWARE MODULES IN INTEGRATED CIRCUIT CARDS, CORRESPONDING APPARATUS AND COMPUTER PROGRAM PRODUCT (71) Applicant: STMicroelectronics S.r.l., Agrate Brianza (IT)

(72) Inventors: Marco Alfarano, Naples (IT); Sofia Massascusa, Caserta (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

This patent is subject to a terminal disclaimer.

(21) Appl. No.: 18/599,642

(22) Filed: Mar. 8, 2024

(65) Prior Publication Data
US 2024/0214817 A1 Jun. 27, 2024

Related U.S. Application Data (63) Continuation of application No. 17/490,742, filed on Sep. 30, 2021, now Pat. No. 11,956,638.

(30) Foreign Application Priority Data

Oct. 30, 2020 (IT) .................. 102020000025870

(51) Int. Cl.
*H04W 12/47* (2021.01)
*G06F 21/12* (2013.01)
(Continued)

(52) U.S. Cl.
CPC .......... *H04W 12/47* (2021.01); *G06F 21/123* (2013.01); *H04W 12/48* (2021.01); *H04W 12/65* (2021.01)

(58) Field of Classification Search
CPC ..... H04W 12/47; H04W 12/48; H04W 12/65; H04W 4/50; H04W 4/80; H04W 12/06;
(Continued)

(56) References Cited

U.S. PATENT DOCUMENTS 9,111,270 B2 8/2015 Fujisawa
2003/0165128 A1 9/2003 Sisodia
(Continued)

FOREIGN PATENT DOCUMENTS

EP 2963955 A1 1/2016
EP 3528518 A1 8/2019
EP 3672300 A1 6/2020

OTHER PUBLICATIONS

GSM Association, "Remote Provisioning Architecture for Embedded UICC", Technical Specification, Version 1.0, Dec. 17, 2013, 294 pages.
(Continued)

*Primary Examiner* — Dominic E Rego
(74) *Attorney, Agent, or Firm* — Slater Matsil, LLP (57) ABSTRACT In an embodiment the method a includes performing, by an integrated circuit (IC) card hosted in a local equipment, authentication with a contactless subscriber device when the subscriber device is within a communication range of a contactless interface of the local equipment, receiving, by the IC card, an identifier (SID) identifying a software module from the subscriber device, the software module configured to enable a subscription profile for a mobile network operator, performing a checking operation at the IC card whether the SID matches a software module identifier stored in the IC card and selectively performing one of downloading the software module to the IC card, enabling
(Continued)

the software module at the IC card or disabling the software module at the IC card as a result of performing the checking operation.

20 Claims, 7 Drawing Sheets

(51) Int. Cl.
*H04W 12/48* (2021.01)
*H04W 12/65* (2021.01)

(58) Field of Classification Search
CPC ..... H04W 12/35; H04W 12/40; H04W 8/183; G06F 21/123; H04L 63/0869
See application file for complete search history.

(56) References Cited

U.S. PATENT DOCUMENTS

| | | |
|---|---|---|
| 2008/0128505 A1 | 6/2008 | Challa |
| 2010/0304670 A1 | 12/2010 | Shuo |
| 2015/0113617 A1 | 4/2015 | Chastain |
| 2015/0281302 A1 | 10/2015 | Winston |
| 2016/0381555 A1 | 12/2016 | Chastain |
| 2017/0161724 A1 | 6/2017 | Lau |
| 2017/0347263 A1 | 11/2017 | Dutta et al. |
| 2017/0356808 A1 | 12/2017 | Smith |
| 2021/0084485 A1 | 3/2021 | Roy |
| 2021/0160683 A1 | 5/2021 | Li |
| 2022/0135039 A1 | 5/2022 | Jardine |
| 2023/0004953 A1 | 1/2023 | Rule |

OTHER PUBLICATIONS

Trusted Connectivity Alliance, "eUICC Profile Package: Interoperable Format Technical Specification", Version 1.0.1, published Jul. 2015, retrieved from https://trustedconnectivityalliance.org/technology-library-sim-specifications, 66 pages.

GSM Association, "Embedded SIM Remote Provisioning Architecture", Version 1.1, Dec. 17, 2013, retrieved from https://www.gsma.com/iot/wp-content/uploads/2014/01/1.-GSMA-Embedded-SIM-Remote-Provisioning-Architecture-Version-1.1.pdf, 84 pages.

GSM Association, "GSMA SAS Standard for Subscription Manager Roles", Version 3.0, Mar. 31, 2017, retrieved from https://www.gsma.com/aboutus/wp-content/uploads/2015/01/FS.08_SAS-SM_Standard_v3.0.pdf, 33 pages.

METHOD FOR REMOTE PROVISIONING OF SOFTWARE MODULES IN INTEGRATED CIRCUIT CARDS, CORRESPONDING APPARATUS AND COMPUTER PROGRAM PRODUCT

CROSS-REFERENCE TO RELATED APPLICATIONS

This application is a continuation of U.S. application Ser. No. 17/490,742, filed on Sep. 30, 2021, claiming the benefit of Italian Patent Application No. 102020000025870, filed on Oct. 30, 2020, which applications are hereby incorporated by reference herein in their entirety.

TECHNICAL FIELD

Embodiments of the present disclosure relate to solutions for remote provisioning of software modules which are configured to be stored in a memory of an integrated circuit card and enabled for operation, in particular, a user profile or a bundle to be enabled in secure platform, hosted in a host device configured to communicate with a remote provisioning server, in particular a SM-DP+, to download, enable or disable such module by a remote provisioning procedure. Embodiments of the present disclosure relate in particular to integrated circuits such as smart cards, SIM, eSIM, eUICC (Universal Integrated Circuit Card), cards according to the SSP (Smartcard Secure Platform) ETSI standard, M2M cards. They can be used, for instance, in the automotive field. The techniques described here may include NFC techniques (Near Field Contact) and UWB (Ultra-wide Band).

BACKGROUND

Due to new requirements of miniaturization and robustness, the industry has developed an evolution of the traditional UICC (Universal Integrated Circuit Card) cards, a smart card integrated into the communication device called "embedded UICC." This evolution envisages that the UICC is soldered (or, in any case, made hardly accessible) in the hosting device, which can be a mobile phone, a modem, a board inserted in a device, etc.

Soldering presents distinct advantages, such as the possibility of reducing the size of the UICC device and, hence, of the modem, the improvement of the robustness of the contacts (soldered contacts are typically more reliable than interfaces between replaceable components), and increased antitheft protection.

On the other hand, soldering a UICC (or making it hardly accessible) introduces new requirements and issues that need to be addressed, such as: as the UICC is not replaceable, means should be available to allow the operator change; specific operations (such as device repairing), that today are typically performed after the UICC removal, require a way to disable the SIM card.

To address the above requirements, the industry has defined a new technological standard called "embedded UICC" or "Remote SIM provisioning."

The basic concepts of the new technological standard are the following: one entity is defined to allow the download/enable/delete of profiles (for instance, the Issuer Secure Domain Root ISD-R, see, for instance, "*Remote Provisioning Architecture for Embedded UICC, Technical Specification, Version* 1.0, 17 Dec. 2013") the UICC may contain several mobile network operator subscriptions; each operator subscription is represented by a "profile;" every profile may be seen as a container; the container is managed by a security domain (for instance the Issuer Secure Domain Profile ISD-P)

The eUICC (embedded UICC) card generates profiles, particularly personalized profile package data.

A Profile is a combination of a file structure, data, and applications stored in an eUICC. A Profile Package is a Personalized Profile using an interoperable description format that is transmitted to an eUICC to load and install a Profile.

For instance, the consortium TCA (Trusted Connectivity Alliance) defines an interoperable format to represent a Profile Package as defined for instance in the TCA reference document "*eUICC Profile Package: Interoperable Format Technical Specification*," available at the URL https://trustedconnectivityalliance.org/technology-library-sim-specifications/(Profile-interoperability-technical-specification_V1-0.pdf, see download section at referred link) and subsequent versions. Such interoperable format represents the structure of data to be built by the profile generating node, e.g. Profile Creator and to be loaded in the eUICC card for the eUICC to be personalized according to the content of the Profile Package. The Profile Creator is responsible for creating the Profile Package based on the MNO (Mobile Network Operator) requirements.

Two families of embedded UICCs are currently defined: the eUICC Industrial cards and the eUICC Consumer cards. The eUICC Industrial cards are directed to applications in automotive/M2M devices managed by a Service provider. Such devices are typically unattended, i.e., without an End User's interaction. Thus, the operations regarding managing software and profiles, e.g., Load/Enabled/Disable/Delete, are issued by a remote server, representing the service provider, since the device performs these operations unattended.

On the other hand, the eUICC Consumer cards are directed to mobile phones, smartwatches, and similar devices, which are typically attended. Therefore, operations for managing software and profiles are issued by the local device, representing the user intent. The device performs these attended operations, i.e., with an end user's interaction.

Figure 1:
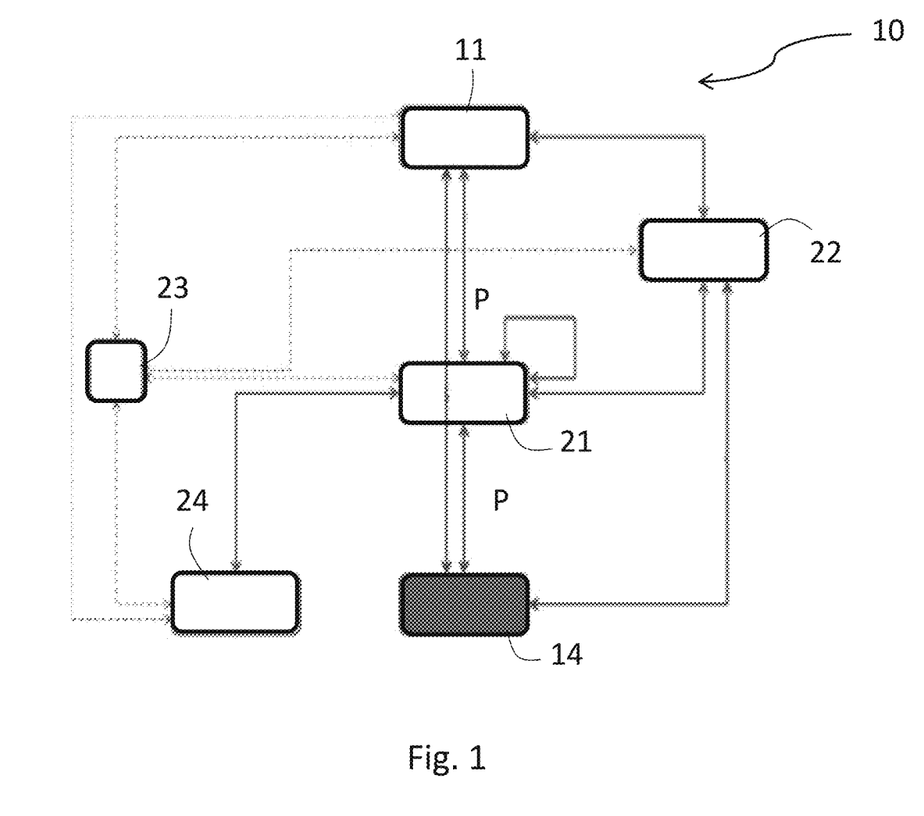
FIG. 1 shows a prior art system for provisioning.

FIG. 1 shows a schematic representation of a system for managing profiles in industrial eUICC cards 10, which includes a data preparation server 11, e.g. SM-DP server, responsible for the creation, generation, management and the protection of resulting profiles at the input/request of the operator. Such data preparation server 11, for instance, may include a database of profiles and, additionally, other modules like an OTA RFM (Over the Air Remote File Management) engine and a Keys Manager. The data preparation server 13 provides, for instance through an OTA (Over The Air) channel, profiles P, in particular personalized profiles, to a Secure Routing server 21, e.g. a SM-SR server, which is configured to secure routing of profiles and usually sends a profile download enabling command to the eUICC card 16, which is embedded in a local equipment 14 (as visible in FIG. 2), i.e. a smart card integrated in a local communication device, thus enabling download and storing of the profile P in the eUICC card 16. The system 10 includes also a Mobile Network (MNO) operator 22, which can issue for instance a profile ordering command to the data preparation server 13. FIG. 1 also indicated a Certificate Issuer 23, which issues Certificates for remote SIM provisioning entities and acts as a trusted third party to authenticate the entities within the system, and an eUICC Manufacturer (EUM) 24, which is responsible for the initial cryptographic configuration and security architecture of the eUICC 16 and is the provider of eUICC products. These system components are not described here in further detail. A description of the operation of the system 10 can be found at https://www.gsma.com/iot/wp-content/uploads/2014/01/1.-GSMA-Embedded-SIM-Remote-Provisioning-Architecture-Version-1.1.pdf and subsequent versions.

Thus, in system 10, the SM-DP (server 11, an OTA server) contains profiles and represents the MNO. The SM-SR (server 21, also an OTA server) executes commands [load/enable . . . ] in batches over the device installation basis, e.g. downloading profiles on all the cards on the field.

Figure 2:
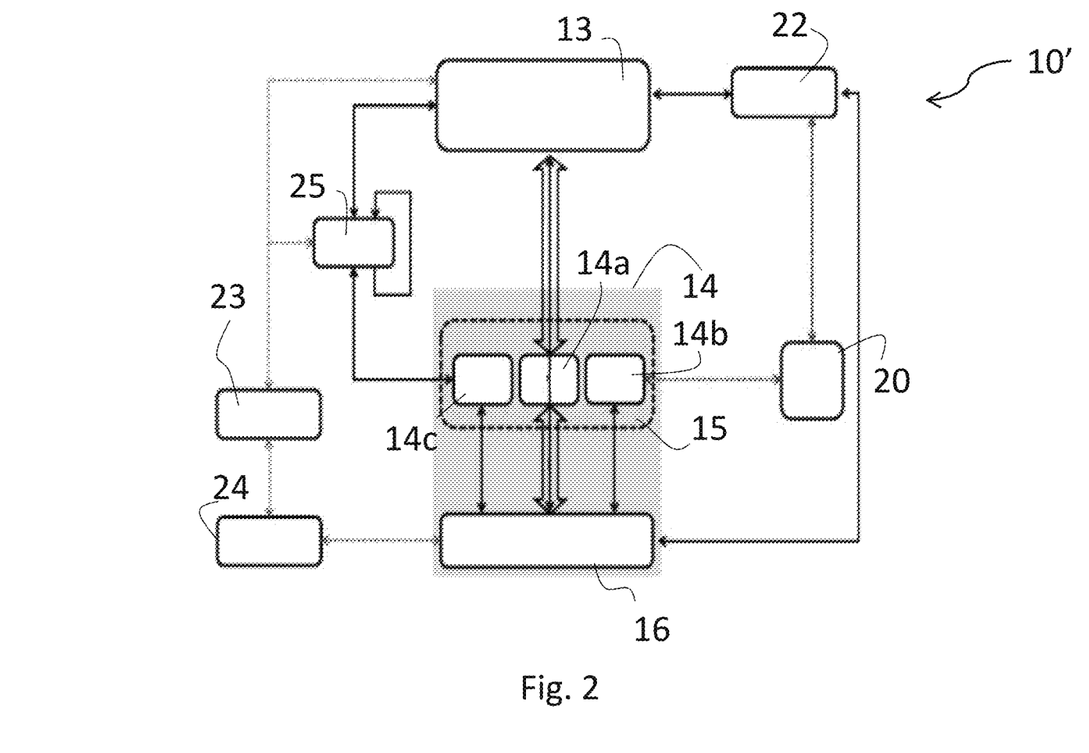
FIG. 2 shows a system for direct provisioning.

FIG. 2 shows a schematic representation of a system for managing profiles in consumer eUICC cards 10', where the data preparation server 13, which is specifically a SM-DP+, i.e. Subscription Manager Data Preparation—enhanced compared to the SM-DP in SGP.02, interacts directly with the local equipment 14, e.g. a mobile telephone or smartphone, and specifically with a software profile management module configured to store profiles in the eUICC 16 and perform operations on said profiles P stored in the eUICC 16, such module being specifically an LPA (Local Profile Assistant) software module 15.

The LPA module 15 is a software running in the local equipment 14 and provides LPA services, such as Profile download or Profile management, to the eUICC 16. The LPA consists of two parts—the LPD (Local Profile Download) 14a and the LUI (Local User Interface) 14b. The LPD 14a plays a proxy role for efficiently downloading a Bound Profile Package between SM-DP+ 13 and eUICC 16, while the LUI interface 14b allows for local profile management on the device by an end user 20. The end user 20 can interact with the local equipment 14 through a user interface or with the MNO 22 through an operator interface. A Local Discovery Service (LDS) 14c is also included in the LPA module 15. System 10' also includes a Subscription Manager-Discovery Server (SM-DS) 25 to provide mechanisms that allow an SM-DP+, like server 13, to inform the Local Discovery Service 14c within any device that an SM-DP+, like server 13, wishes to communicate with it. A description of the operation of system 10' can be found at https://www.gsma.com/aboutus/wp-content/uploads/2015/01/FS.08_SAS-SM_Standard_v3.0.pdf.

Thus, in the consumer architecture of the system 10' the SM-DP+ server (an OTA server) contains profiles and represents the MNO. The LPA (an application on the local equipment, e.g. the phone) executes commands [load, enable, etc.] on the user equipment phone. For instance, the user changes the operator using the GUI (Graphical User Interface) of the LPA.

The techniques here taken into consideration are those where MNOs (Mobile Network Operators) do not accept peer-to-peer profile/bundle transfer.

A possible scenario in such circumstances is that of a user desiring to perform an operation such as loading, enabling, or disabling a subscription.

This operation may encounter problems. If using an integrated circuit card such as M2M eSIM, this kind of card relies on Remote Management, i.e., the MNO, not the user, starts the load/enable/disable initiative. If using a Consumer eSIM, within a screenless device (e.g., antenna, smart meter), no user interface is available, thus this cannot be done.

SUMMARY

Embodiments provide solutions that overcome one or more of the previously outlined drawbacks.

Embodiments concern a related system for the remote provisioning of software modules, as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is intended to highlight the possibility of the present disclosure being implemented in a distributed/modular fashion.

As mentioned in the foregoing, the present disclosure provides solutions regarding a method for remote provisioning of software modules, which are configured to be stored in a memory of an integrated circuit card and enabled for operation, in particular a subscription profile or a bundle to be enabled in a secure platform, hosted in a local equipment configured to communicate with a remote provisioning server, in particular a data preparation server or SM-DP+ server, to download, enable or disable said software module, comprising using a subscriber contactless communicating device, in particular a smartcard, to initiate the download or enabling or disabling of a software module in an integrated circuit card by means of a contactless transaction, comprising the following operations: performing a contactless interaction between the contactless device and the local equipment hosting the integrated circuit card, in particular by placing the contactless subscriber device within the communication range determined by a corresponding contactless interface in the local equipment, starting a mutual authentication between the contactless device and the IC card in the host device as a consequence of said contactless interaction, sending an identifier, identifying the software module, stored in the subscriber contactless communicating device to the integrated circuit card, checking at the integrated circuit card if the software module identifier matches a software module identifier stored in said integrated circuit card, selecting and performing one operation among downloading said software module to the integrated circuit card, enabling the software module and disabling the software module, in function of the result of said checking operation.

In variant embodiments, the solution here described may include that if the result of said checking operations is that the software module is not stored in the integrated circuit card, downloading said software module to the integrated circuit card is performed, if the result of said checking operations is that the software module is stored in the integrated circuit card but not enabled, enabling the software module is performed, if the result of said checking operations is that the software module is stored in the integrated circuit card and enabled, disabling the software module is performed.

In variant embodiments, the solution here described may include that said downloading includes that the integrated circuit card replies its card identifier to the local equipment; said local equipment is configured to, upon receiving the card identifier from the card, send a downloading request providing the server with the subscriber identifier; said server responds to the downloading request preparing and sending an encrypted software module to the local equipment, loading said software module in the integrated circuit card; enabling by the integrated circuit card the software module for operation.

In variant embodiments, the solution described here may include that said disabling the software module includes that the integrated circuit card issues a reply comprising information that a software module with the subscriber identifier is already present and it is enabled, to the local equipment; the local equipment asks the server to disable the software module; the server communicates to the local equipment the disabling; the local equipment communicates the disabling to the integrated circuit card.

In variant embodiments, the solution here described may include that said enabling the software module includes that the integrated circuit card issues a reply comprising information that a software module with the subscriber identifier is already present and it is disabled to the local equipment; the local equipment asks the server to enable the software module; the server communicates to the local equipment the enabling; the local equipment communicates the enabling to the integrated circuit card.

In variant embodiments, the solution here described may include that said operation among downloading said software module to the integrated circuit card, enabling the software module and disabling the software module, in function of the result of said checking operation is performed interacting with a SM-DP server.

In variant embodiments, the solution here described may include that said contactless subscriber device is an NFC device, and performing a contactless interaction between the contactless subscriber device and the local equipment hosting the integrated circuit card includes tapping said contactless subscriber device on said local equipment.

In variant embodiments, the solution here described may include that said contactless subscriber device is a UWB device, and after performing a contactless interaction, a confirmation step is performed, in particular interacting with an input means of the local equipment.

In variant embodiments, the described solution may include that said software module is a subscriber profile.

The present disclosure also provides solutions regarding a system for remote provisioning of software modules, which are configured to be stored in a memory of an integrated circuit card and enabled for operation, in particular, a subscription profile or a bundle to be enabled in a secure platform, comprising a local equipment hosting said integrated circuit card and configured to communicate with a remote provisioning server, in particular a SM-DP+ server, to download, enable or disable said software module, comprising, wherein said system further comprises a contactless subscriber device, wherein said system is configured to perform the operations of the method according to any of the previous embodiments.

In variant embodiments, the system here described may include that said local equipment is configured to operate with a mobile communication network and is one among a mobile communication terminal, a M2M machine, and a vehicle communication system.

The present disclosure also provides solutions regarding a computer program product that can be loaded into the memory of at least one processor and comprises portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting examples.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification is not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures, parts, elements, or components that have already been described with reference to FIG. 1 are denoted by the same references previously used in such Figures. The description of such previously described elements will not be repeated in the following in order not to overburden the present detailed description.

In brief, the solution described uses a subscriber contactless communicating device, in particular a smartcard, for instance operating according to NFC or UWB, to trigger the provisioning, enabling, or disabling of a software module in an integrated circuit card by means of a contactless transaction.

Following the contactless interaction, such as a card tap, between the contactless device and the device comprising the integrated circuit card, in particular by placing the contactless subscriber device within the communication range determined by a corresponding contactless interface in the host device, after a mutual authentication between the contactless device and the IC card in the host device, a subscriber identifier, i.e. identifying subscription to a particular profile or software bundle, stored in the subscriber contactless communicating device is sent to the IC card. The IC card checks the subscriber identifier against identifications stored in the card, performing one operation among downloading the software module, enabling the software module, or disabling the software module in the function of the result of said checking operation, i.e., the subscriber identifier is respectively not already stored, disabled or enabled.

Figure 3:
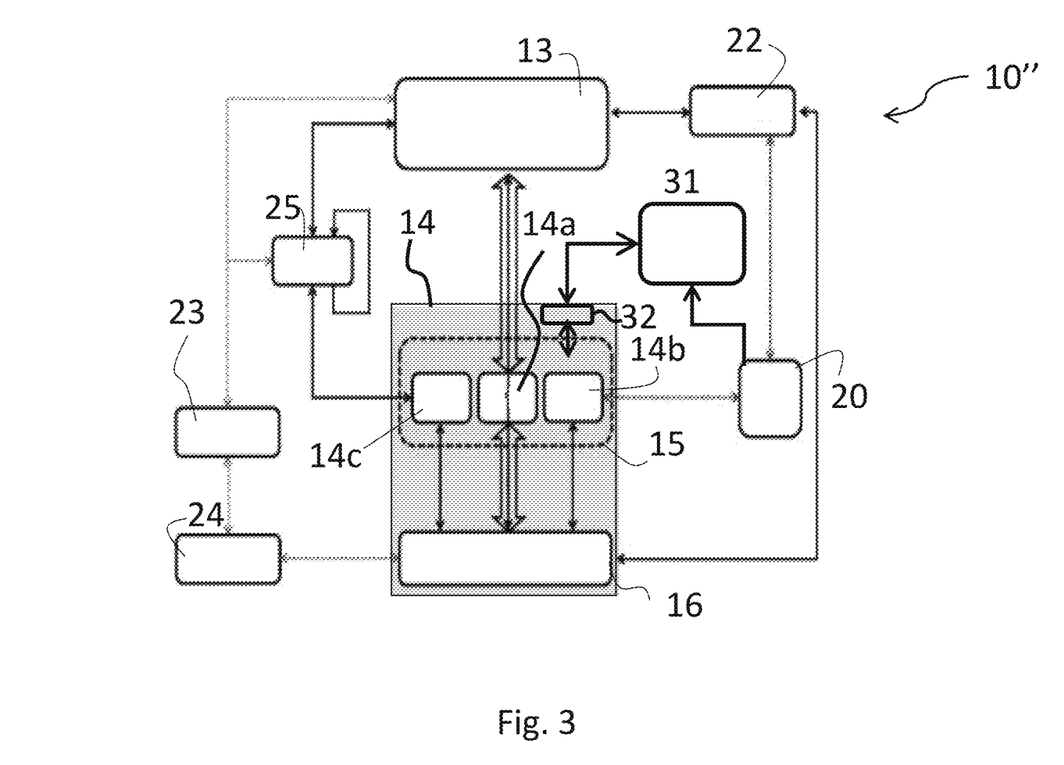
FIG. 3 schematically describes a system for remote provisioning configured to operate by a method according to embodiments.

FIG. 3 schematically describes a system for remote provisioning configured to operate with the method of the solution here proposed.

The system 10" corresponds to that shown in FIG. 2. However, a subscriber contactless device 31 is provided, which is operable by the user 20, e.g., an NFC card that stores a subscriber identifier representing a subscription to the local equipment 14. Such local equipment 14 further includes a contactless interface 32, e.g. a NFC interface, including a NFC transceiver, to communicate with the subscriber contactless device 31 when such subscriber contactless device 31 is placed within the communication range determined by the corresponding contactless interface 32 in the host device, i.e. the local equipment 14. Near-Field-Communication (NFC) may refer to a set of communication protocols for communication between two electronic devices over a distance of 4 cm or less, for instance, according to ECMA-340 and ISO/IEC 18092 standards. In variant embodiments, UWB technology may be used, with a UWB tag as the device storing the subscriber identity 31 and a UWB module. The UWB tag may operate as the contactless interface 32, e.g., inside a vehicle, allowing access to local equipment 14, which may be the mobile communication system of the vehicle or another equipment using an M2M card.

Figure 4:
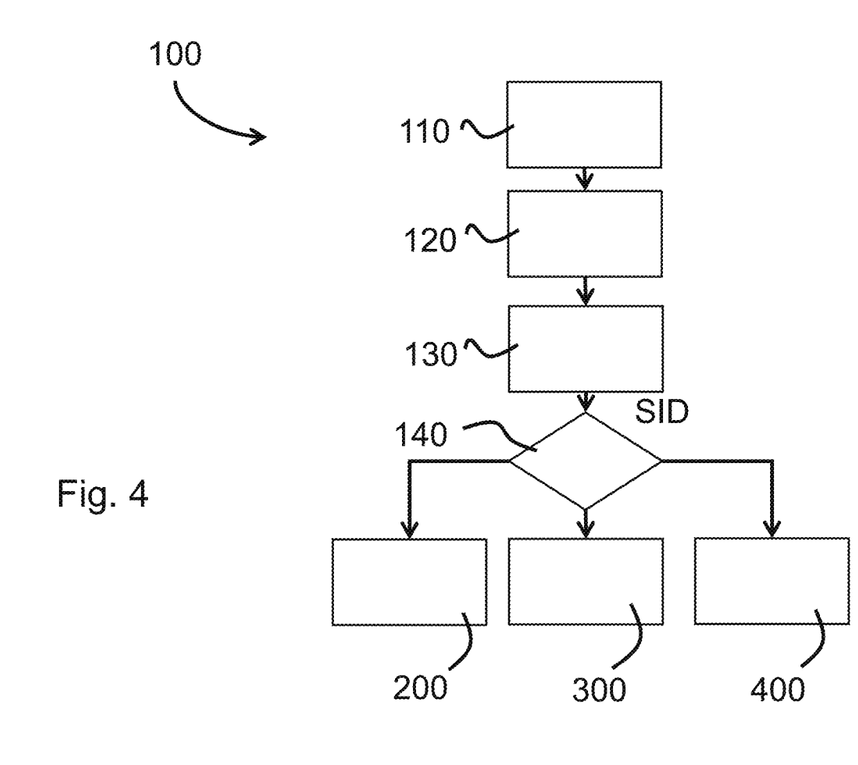
FIG. 4 shows a flow diagram illustrating operations of an embodiment of a method according to embodiments.

FIG. 4 shows a flow diagram illustrating operations of an embodiment of the method here described, indicated with the reference number 100.

The method includes in a step 110 performing a contactless interaction between the subscriber contactless device 31, e.g., an NFC card, and the local equipment 14, e.g., a smartphone or tablet, comprising the integrated circuit card 16, for instance an eSIM. This embodiment is performed by placing the contactless subscriber device within the communication range determined by a corresponding contactless interface, e.g., an NFC interface 32 associated to the local equipment 14.

Then, at 120, mutual authentication is started between the subscriber contactless device 31 and the integrated circuit card 16 in the local equipment 14. The integrated circuit card 16, jointly with the local equipment 14 and the contactless interface 32, may be considered equivalent to a contactless reader, particularly an NFC reader, and mutual authentication protocol between the contactless tag and the reader may be performed. Authentication information to perform the mutual authentication may also be stored in the integrated circuit card 16, i.e., the subscriber contactless device 31 and integrated circuit card 16 may store and execute mutually cooperating encryption algorithm to perform such mutual authentication certificate based on, e.g., a digital signature, inSign, ETSI-MSS, or two (or multi) factors.

At 130, a subscriber identifier SID stored in the subscriber contactless communicating device 32 is sent to the integrated circuit card 16, asking the integrated circuit card 16 to perform a check operation on the subscriber identifier SID. The subscriber identifier SID is an identity code or number identifying a specific subscription, e.g. a specific profile P.

At 140, the integrated circuit card 16 checks the subscriber identifier SID by comparing it with other subscriber identities stored in the integrated circuit card 16. In particular, the subscriber identities stored in the integrated circuit card 16 correspond to profiles P and the card is able to detect whether they are absent, disabled or enabled.

The checking operation 140 selects one of the following as an output: downloading 200 the software module, e.g., profile P, enabling 300 the software module, and disabling 400 the software module. For example, the operation may detect that the software module, i.e., profile P, is respectively absent, already present disabled, or already present enabled.

Each of the operations 200, 300, and 400 scenarios involves interaction with a remote provisioning server, in particular SM-DP+ server 13, as shown in FIG. 2, although in variant embodiments SM-SR similar to the one in FIG. 1 may be used.

Operations 110-140 and 200 are described in further detail with reference to the sequence diagram of FIG. 5, which represents actions T1 . . . T8 performed by some of the entities or nodes of the system 10" schematically represented in FIG. 3. Specifically, transactions among the subscribed contactless device 31, the local equipment 14, the integrated circuit card 16, an eSIM, the remote server 13, a SM-DP+, and a mobile communication network 40 are shown.

In a first transaction T1 the user 20 performs operation 110, i.e. taps the subscribed contactless device 31. As it is known, tapping an NFC card means bringing the NFC circuit in close proximity, within the range allowed by the NFC technology for communication, with a corresponding NFC interface in the local equipment 14. In variant embodiments, where the subscriber device 11 is a device equipped with a UWB communicating module, the range allowed by the UWB is far greater, therefore the interaction is better defined as placing the subscriber device 11 within the communication range of the corresponding interface in the local equipment 14.

Then, in transaction T2, a mutual authentication between the subscribed contactless device 31 and the eSIM card 16 is performed, in particular through the local equipment 14 and interface 32, performing operation 120. The subscriber contactless device 31 then sends T3 a message to eSIM card 16 asking to check subscriber identifier SID, which is performed as operation 140 in FIG. 4. In case the subscriber identifier SID does not match the ones the eSIM card 16 has on-board, i.e., the profile corresponding to the subscriber identifier SID received is absent, the eSIM card 16 replies in a transaction T4 with its card identifier, in particular eUICC Identifier, EID, to the local equipment 14. The local equipment 14 is configured to, upon receiving the eUICC Identifier EID from the card 16, to perform a transaction T5 sending a Profile Downloading Request to the server 13, SM-DP+, with SID identifier. The server 13 responds to the Profile Downloading Request preparing and sends in a transaction T6, an encrypted profile, specifically a Protected Profile Package, to the local equipment 14.

Then the profile P in a transaction T7 is loaded by the LPA in the integrated circuit card 16. The eSIM 16 in a transaction T7 enables the profile P and in a transaction T8 connects to the mobile network 40. This means that the local equipment 14 with the eSIM 16 can now operate, e.g., exchange phone calls and data, with the mobile network 40 according to the subscription defined in profile P.

Figure 5:
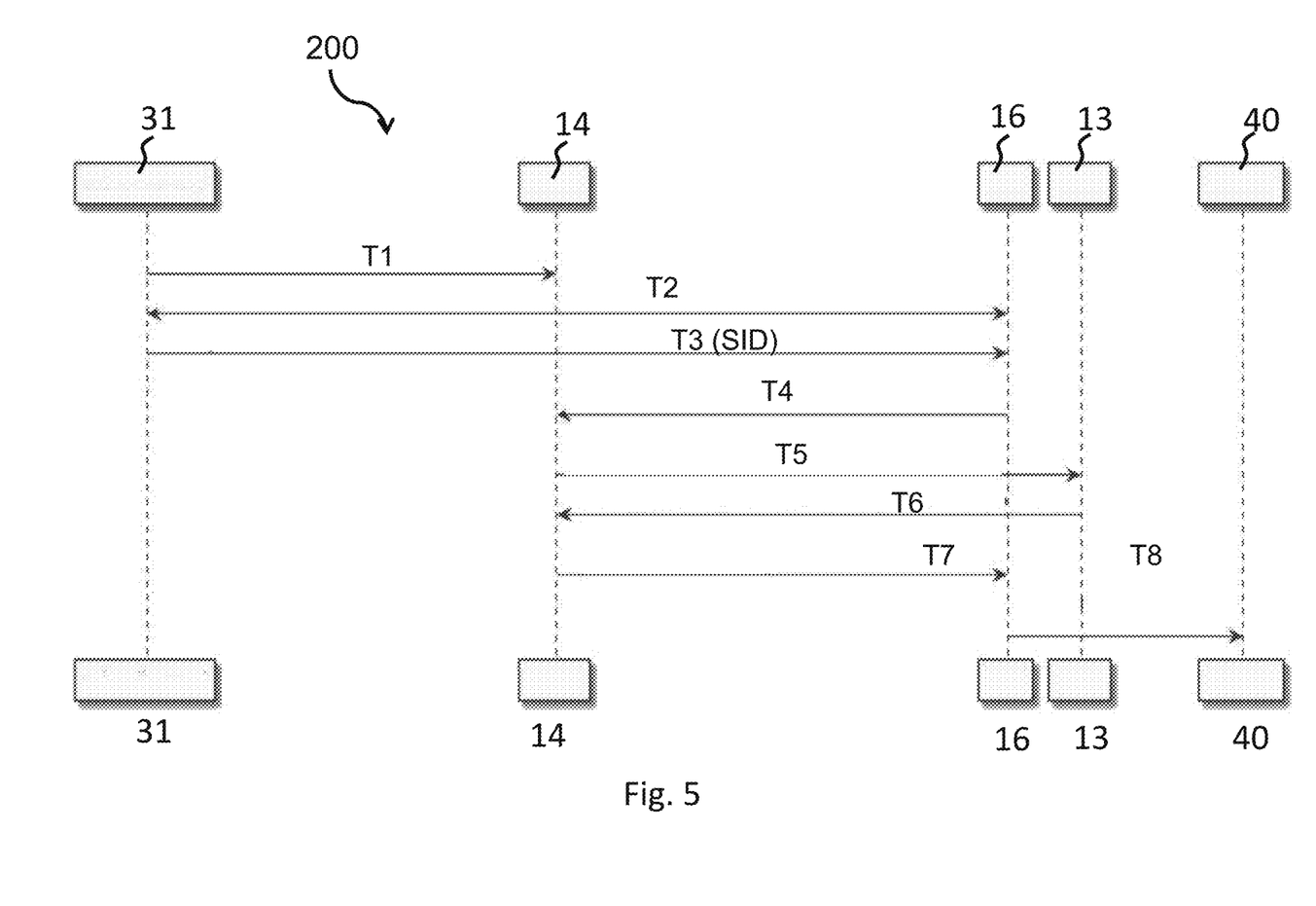
FIG. 5 shows a sequence diagram representing a first set of actions performed by entities of the system configured to operate by a method according to embodiments.

Thus operation 200 substantially corresponds to transactions T4-T8 in FIG. 5.

Figure 6:
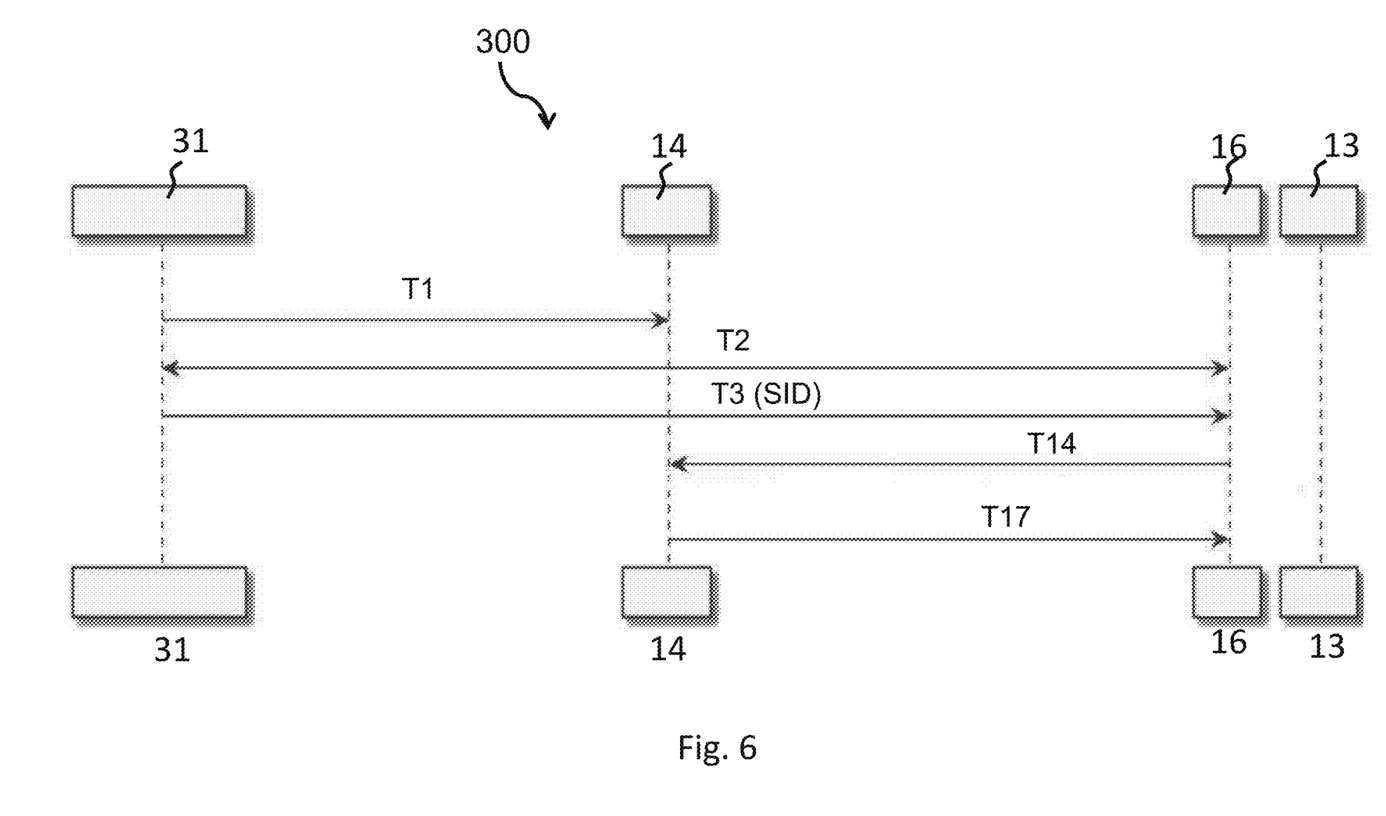
FIG. 6 shows a sequence diagram representing a second set of actions performed by entities of the system configured to operate by a method according to embodiments.
Figure 7:
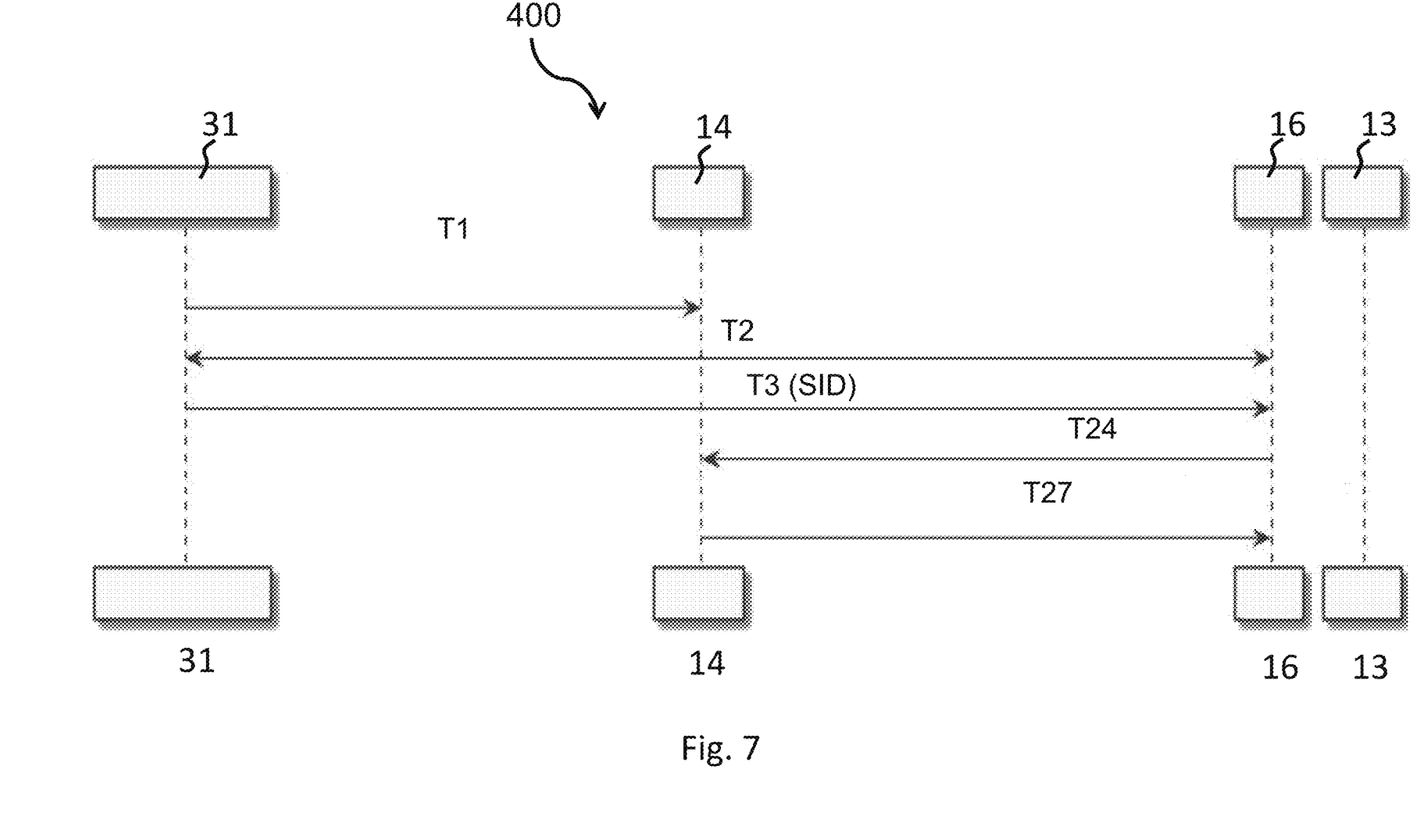
FIG. 7 shows a sequence diagram representing a third set of actions performed by entities of the system configured to operate by a method according to embodiments.

Operations 110-140 and 300 are described in further detail with reference to the sequence diagram of FIG. 6, which represents actions T1 . . . T3, T14 . . . T17 performed by some of the entities or nodes of the system 10" schematically represented in FIG. 3. In a first transaction T1 the user 20 performs operation 110, i.e. taps the subscribed contactless device 31. Then, in transaction T2, a mutual authentication between the subscribed contactless device 31 and the eSIM card 16 is performed, in particular through the local equipment 14 and interface 32, performing operation 120. The subscribed contactless device 31 then sends T3 a message to eSIM card 16 asking to check subscriber identifier SID, which is performed as operation 140 in FIG. 4. In a first transaction T1 the user 20 performs operation 110, i.e. taps the subscribed contactless device 31. Then, in transaction T2, a mutual authentication between the subscribed contactless device 31 and the eSIM card 16 is performed, in particular through the local equipment 14 and interface 32, performing operation 120. The subscribed contactless device 31 then sends T3 a message to eSIM card 16 asking to check subscriber identifier SID, which is performed as operation 140 in FIG. 4.

In case the subscriber identifier SID matches an identification the eSIM has already on-board, i.e. a profile P with the subscriber identifier SID is already present and it is enabled, the eSIM 16 issues a reply T14 comprising a corresponding information to the local equipment 14. The local equipment 14 in a transaction T17 communicates to the eSIM card 16 that the profile P is to be disabled and the eSIM card 16 disables the profile P.

Operations 110-140 and 400 are described in further detail with reference to the sequence diagram of FIG. 6, which represents actions T1 . . . T3, T24 . . . T27 performed by some of the entities or nodes of the system 10" schematically represented in FIG. 3. In a first transaction T1 the user 20 performs operation 110, i.e. taps the subscribed contactless device 31. Then in transaction T2 a mutual authentication between the subscribed contactless device 31 and the eSIM card 16 is performed, in particular through the local equipment 14 and interface 32, performing operation 120. The subscribed contactless device 31 then sends T3 a message to eSIM card 16 asking to check subscriber identifier SID, which is performed as operation 140 in FIG. 4. In a first transaction T1 the user 20 performs operation 110, i.e. taps the subscribed contactless device 31. Then, in transaction T2, a mutual authentication between the subscribed contactless device 31 and the eSIM card 16 is performed, in particular through the local equipment 14 and interface 32, performing operation 120. The subscribed contactless device 31 then sends T3 a message to eSIM card 16 asking to check subscriber identifier SID, which is performed as operation 140 in FIG. 4.

In case the subscriber identifier SID matches an identification in the eSIM 16 has onboard, i.e. a profile P with the subscriber identifier SID is already present and it is disabled, the eSIM 16 issues a reply T24 comprising a corresponding information to the local equipment 14. Then, the card 16 is asked by the local equipment in a transaction T27, similar to transaction T17, to enable the profile P. Upon such asking T27, the eSIM card 16 then performs the enabling of the profile P. Once the profile is enabled, registration operations on the network (e.g. on the SM-SR server) may follow.

The local equipment 14 communicates in transaction T27 that the profile P is enabled to the eSIM 16, i.e. the local equipment 14 with the eSIM 16 can operate, e.g. exchange phone calls and data, with the mobile network 40 according to the subscription defined in profile P.

The method described can also be applied to a software module, which is a Secondary Secure Platform bundle, which has to be downloaded to a Secure Platform in a card and then enabled, or vice versa, disabled if already present.

The operation 110, performing a contactless interaction between the subscriber contactless device 31 and the local equipment 14 associated with the integrated circuit card 16, is performed by placing the contactless subscriber device 31 within the communication range determined by a corresponding contactless interface, e.g. NFC interface 32, associated to the local equipment 14, but it can also be performed using UWB for automotive, for instance when the NFC tap is not suitable. Since the presence of the subscriber identifier SID in the radio coverage area is not enough to guarantee the user intention, it requires a further step, such as a user interaction with a graphic interface menu, or other input means of the local equipment, in particular in the vehicle this example, equipped with a UWB interface and an integrated circuit card which stores a profile P or in which a profile P has to be downloaded.

Thus, the method proposed by using a contactless interface allows: profile management even if device is not equipped with a display and/or not portable and/or not reachable (UWB); profile management within a vehicle just accessing NFC antenna; for UWB, Profile management within a vehicle, without accessing soldered module or NFC antenna, for instance by means of an input means represent by a vehicle display.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A system for remote provisioning of software modules, the system comprising:
 a local equipment configured to communicate with a remote provisioning server to download, enable, or disable a corresponding software module of the software modules;
 an integrated circuit (IC) hosted in the local equipment, the integrated circuit having a memory storage, the memory storage configured to store the software modules, the software modules enabling an operation of a subscription profile or a bundle to be enabled in a secure platform;
 a non-transitory memory storage comprising instructions; and
 a processor in communication with the non-transitory memory storage, wherein the instructions, when executed by the processor, cause the system to:
  perform a contactless interaction by placing a contactless subscriber device within a communication range of the local equipment, wherein the subscriber device is used to initiate a download, an enabling or a disabling of the software module,
  start a mutual authentication between the subscriber device and the IC card in the local equipment in response to the contactless interaction,
  send an identifier (SID) identifying the software module stored in the subscriber device to the IC card,
  perform a checking operation at the IC card to determine whether the SID matches a software module identifier stored in the IC card, and
  selectively perform one of downloading the software module to the IC card, enabling the software module in the IC card, and disabling the software module in the IC card as a result of performing the checking operation.

2. The system of claim 1, wherein selectively performing comprises:
 downloading the software module to the IC card in response to the checking operation determining that the software module is not stored in the IC card,
 enabling the software module in response to the checking operation determining that the software module is stored in the IC card but disabled, and disabling the software module in response to the checking operation determining that the software module is stored in the IC card and enabled.

3. The system of claim 2, wherein the instructions, when executed by the processor, cause the system to:
provide, by the IC card, an IC card identifier to the local equipment;
send, by the local equipment, a downloading request with the IC card identifier to the remote provisioning server;
receive, by the local equipment an encrypted software module from the remote provisioning server responsive to the IC card identifier;
load the encrypted software module in the IC card; and
enable, by the IC card, the encrypted software module for operation of the subscription profile.

4. The system of claim 2, wherein disabling the software module comprises:
providing, by the IC card, information to the local equipment that the software module with a subscriber identifier is already present and is enabled;
receiving, by the IC card, a request to disable the software module from the local equipment; and
performing, by the IC card, disabling of the software module.

5. The system of claim 2, wherein enabling the software module comprises:
providing, by the IC card, information to the local equipment that the software module with a subscriber identifier is already present and is disabled;
receiving, by the IC card, a request to enable the software module from the local equipment; and
performing, by the IC card, enabling of the software module.

6. The system of claim 1, wherein the remote provisioning server is a Subscription Manager-Discovery Server (SM-DS server) or a SM-DP+ server, and wherein the local equipment is configured to operate with a mobile communication network.

7. The system of claim 1, wherein the subscriber device is:
a Near Field Contact (NFC) device, wherein performing the contactless interaction between the subscriber device and the local equipment includes tapping the subscriber device on the local equipment; or
an ultra-wide band (UWB) device, wherein the instructions, when executed by the processor, cause the system to provide confirmation via a graphical User Interface (GUI) of the local equipment after the contactless interaction is performed.

8. The system of claim 1, wherein the IC card is a SIM, an eSIM, an eUICC (Universal Integrated Circuit Card), a card according the SSP (Smartcard Secure Platform) ETSI standard, or a M2M card.

9. A non-transitory computer-readable media storing computer instructions for remote provisioning of software modules to be stored in a memory of an integrated circuit (IC) card, the software modules enabling an operation of a subscription profile or a bundle to be enabled in a secure platform, the IC card being hosted in a local equipment, and the local equipment communicating with a remote provisioning server to download, enable, or disable a corresponding software module, the instructions, when executed by a processor, cause the processor to:
perform a contactless interaction by placing a contactless subscriber device within a communication range of the local equipment, wherein the subscriber device is used to initiate a download, an enabling or a disabling of the software module;
start a mutual authentication between the subscriber device and the IC card in the local equipment in response to the contactless interaction;
send an identifier (SID) identifying the software module stored in the subscriber device to the IC card;
perform a checking operation at the IC card to determine whether the SID matches a software module identifier stored in the IC card; and
selectively perform one of downloading the software module to the IC card, enabling the software module in the IC card, and disabling the software module in the IC card as a result of performing the checking operation.

10. The non-transitory computer-readable media of claim 9, wherein selectively performing comprises:
downloading the software module to the IC card in response to the checking operation determining that the software module is not stored in the IC card,
enabling the software module in response to the checking operation determining that the software module is stored in the IC card but disabled, and
disabling the software module in response to the checking operation determining that the software module is stored in the IC card and enabled.

11. The non-transitory computer-readable media of claim 10, wherein the instructions, when executed by the processor, cause the processor to:
provide, by the IC card, an IC card identifier to the local equipment;
send, by the local equipment, a downloading request with the IC card identifier to the remote provisioning server;
receive, by the local equipment an encrypted software module from the remote provisioning server responsive to the IC card identifier;
load the encrypted software module in the IC card; and
enable, by the IC card, the encrypted software module for operation of the subscription profile.

12. The non-transitory computer-readable media of claim 10, wherein disabling the software module comprises:
providing, by the IC card, information to the local equipment that the software module with a subscriber identifier is already present and is enabled;
receiving, by the IC card, a request to disable the software module from the local equipment; and
performing, by the IC card, disabling of the software module.

13. The non-transitory computer-readable media of claim 10, wherein enabling the software module comprises:
providing, by the IC card, information to the local equipment that the software module with a subscriber identifier is already present and is disabled;
receiving, by the IC card, a request to enable the software module from the local equipment; and
performing, by the IC card, enabling of the software module.

14. The non-transitory computer-readable media of claim 9, wherein the remote provisioning server is a Subscription Manager-Discovery Server (SM-DS server) or a SM-DP+ server, and wherein the local equipment is configured to operate with a mobile communication network.

15. The non-transitory computer-readable media of claim 9, wherein the subscriber device is:
a Near Field Contact (NFC) device, wherein performing the contactless interaction between the subscriber device and the local equipment includes tapping the subscriber device on the local equipment; or an ultra-wide band (UWB) device, wherein the instructions, when executed by the processor, cause the system to provide confirmation via a graphical User Interface (GUI) of the local equipment after the contactless interaction is performed.

16. The non-transitory computer-readable media of claim 9, wherein the IC card is a SIM, an eSIM, an eUICC (Universal Integrated Circuit Card), a card according to the SSP (Smartcard Secure Platform) ETSI standard, or a M2M card.

17. A system for remote provisioning of software modules, the system comprising:

a non-transitory memory storage comprising instructions; and a processor in communication with the non-transitory memory storage, wherein the instructions, when executed by the processor, cause the system to:

perform, by an integrated circuit (IC) card hosted in a local equipment, authentication with a contactless subscriber device in response to the subscriber device being within a communication range of a contactless interface of the local equipment, receive, by the IC card, an identifier (SID) identifying a software module from the subscriber device, the software module enabling a subscription profile for a mobile network operator, perform a checking operation at the IC card to determine whether the SID matches a software module identifier stored in the IC card, and selectively perform one of downloading the software module to the IC card, enabling the software module at the IC card, or disabling the software module at the IC card as a result of performing the checking operation.

18. The system of claim 17, wherein selectively performing comprises:

downloading the software module to the IC card in response to the checking operation determining that the software module is not stored in the IC card, enabling the software module in response to the checking operation determining that the software module is stored in the IC card but disabled, and disabling the software module in response to the checking operation determining that the software module is stored in the IC card and enabled.

19. The system of claim 17, wherein the instructions, when executed by the processor, cause the system to:

provide, by the IC card, an IC card identifier to the local equipment;

send, by the local equipment, a downloading request with the IC card identifier to a remote provisioning server;

receive, by the local equipment an encrypted software module from the remote provisioning server responsive to the IC card identifier;

load the encrypted software module in the IC card; and enable, by the IC card, the encrypted software module for operation of the subscription profile.

20. The system of claim 17, wherein disabling the software module comprises:

providing, by the IC card, information to the local equipment that the software module with a subscriber identifier is already present and is enabled;

receiving, by the IC card, a request to disable the software module from the local equipment; and performing, by the IC card, disabling of the software module.

* * * * *